Figure 1:
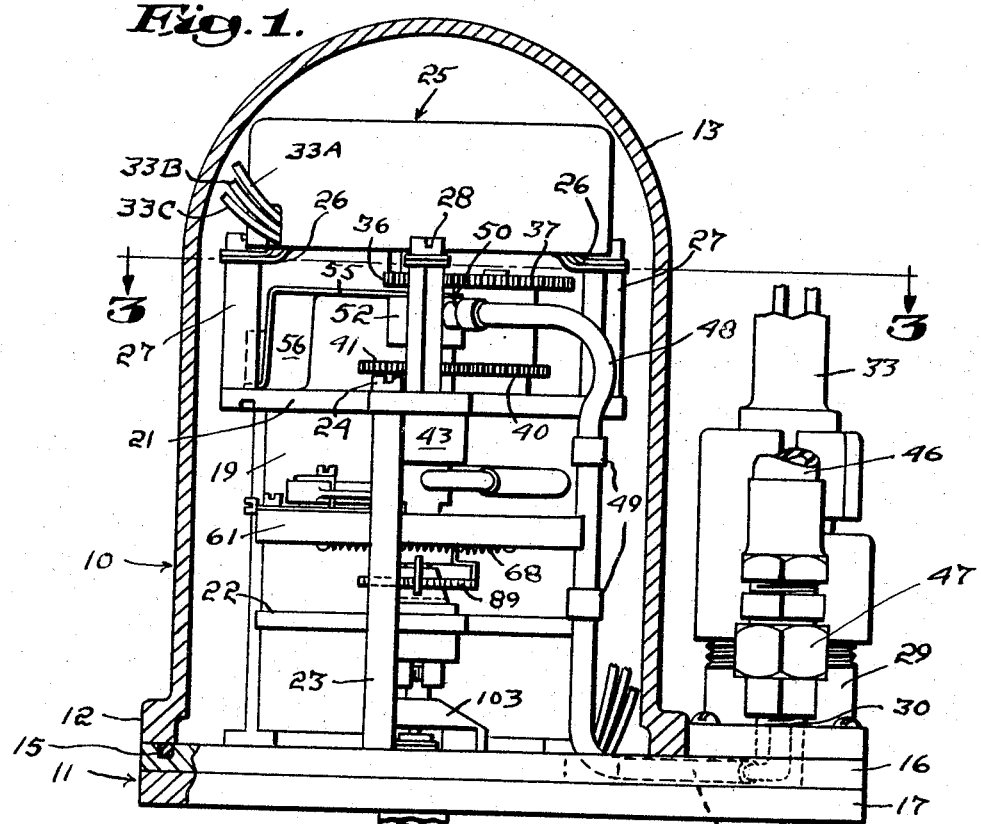

May 16, 1967

D. W. BROOKFIELD 3,319,459

VISCOMETERS

Filed Feb. 11, 1965

3 Sheets-Sheet 1

Inventor:
Donald W. Brookfield,
by Albert Spear, Attorney

May 16, 1967  D. W. BROOKFIELD  3,319,459
VISCOMETERS
Filed Feb. 11, 1965  3 Sheets-Sheet 2
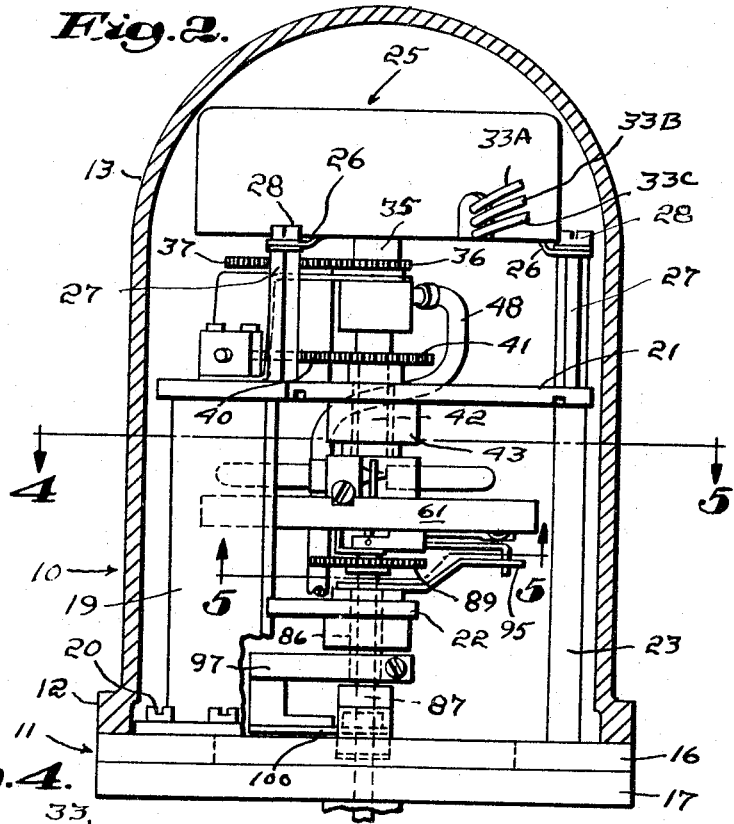
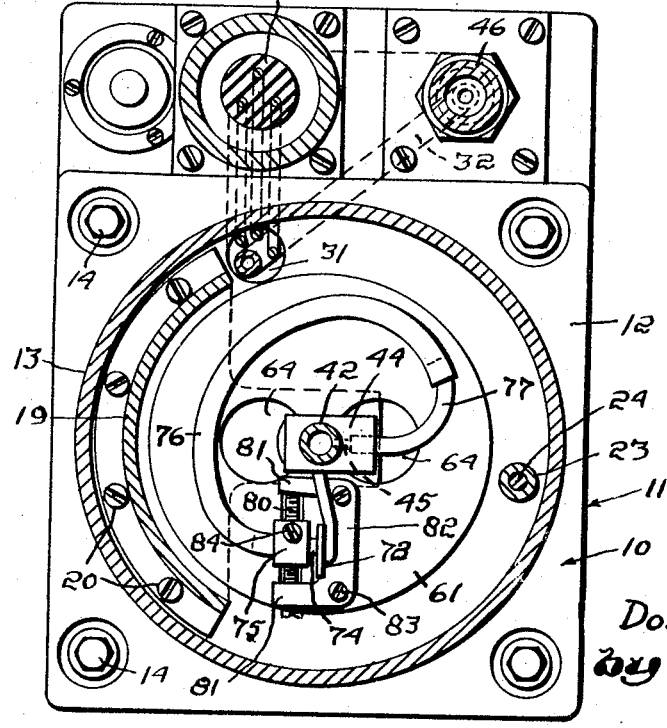
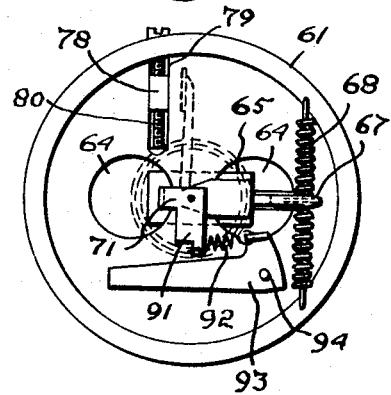
Inventor:
Donald W. Brookfield,
by Abbott Spear
Attorney May 16, 1967 D. W. BROOKFIELD 3,319,459
VISCOMETERS
Filed Feb. 11, 1965 3 Sheets-Sheet 3

Inventor:
Donald W. Brookfield,
by A. H. Spear
Attorney

United States Patent Office 3,319,459
Patented May 16, 1967

3,319,459
VISCOMETERS
Donald W. Brookfield, 168 Massapoag Ave.,
Sharon, Mass. 02067
Filed Feb. 11, 1965, Ser. No. 431,791
3 Claims. (Cl. 73—59)

The present invention relates to viscometers of the type wherein pneumatic signals are generated in response to viscosity changes of a small order. A viscometer of that type is shown in the co-pending application of William B. Brookfield, Ser. No. 245,637, filed Dec. 17, 1962, now Patent No. 3,169,392.

In this type of viscometer, there is a motor driven flywheel provided with an outlet port to which air under pressure is delivered while the flywheel is rotating. A valve member is mounted to move into and out of a position closing that port and is attached to a coil spring. The coil spring is the driving connection for a driven member and becomes partly wound, when the driving member torque exceeds a predetermined value, and is then operative to swing the valve member out of its port closing position to provide a basis for pulse or signal generation.

In such viscometers, the means for delivering air to the outlet port presents a problem since it includes a rotatable connection. Such connections have frequently proved troublesome because of leakage and friction problems. The particular objective of the present invention is to eliminate such problems, and this objective is achieved by providing a hollow motor driven shaft journalled in a support and a cap, preferably of a plastic of the self-lubricating type, is seated on the upper end of the shaft and provided with an air passage therethrough which is in communication with the axial passage through the shaft. The cap and shaft have mating concave and convex faces and the cap is held against rotation by a spring holding the cap seated on the upper end of the shaft under enough pressure to prevent leakage. With this construction, a simple rotatable connection is provided that remains leakage-free for long periods with a minimum of friction and is quickly and easily serviced when such is necessary.

In the accompanying drawings, there is shown an illustrative embodiment of the invention from which these and other of its objectives, novel features, and advantages will be readily apparent.

Figure 3:
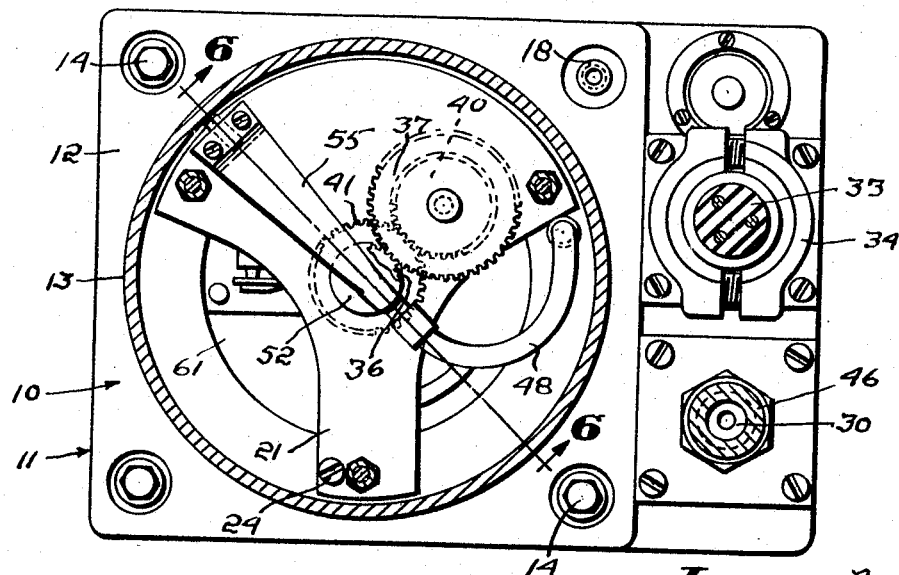
Figure 6:
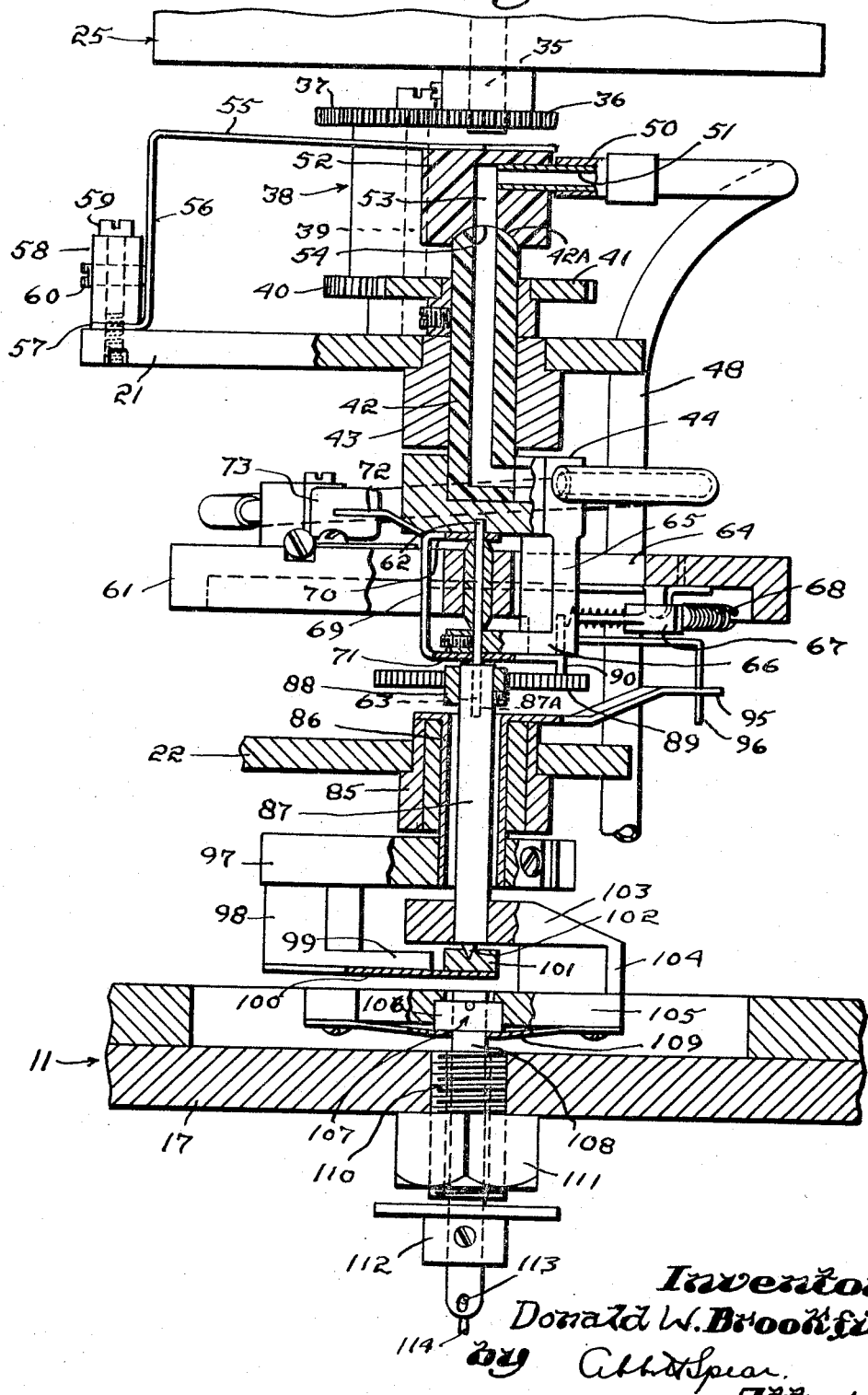

In the drawings:

FIGURE 1 is a side elevation of a viscometer in accordance with the invention with its housing shown in section, FIGURE 2 is a similar view showing the viscometer as turned 90° from its FIGURE 1 position, FIGURE 3 is a section taken approximately along the indicated lines 3—3 of FIGURE 1, FIGURE 4 is a section taken approximately along the indicated lines 4—4 of FIGURE 2, FIGURE 5 is a bottom view of the fly wheel, and FIGURE 6 is a section, on an increased scale, taken approximately along the indicated lines 6—6 of FIGURE 3.

In the drawings, a viscometer such as that shown in the above referred to co-pending application is generally indicated at 10 and is shown as having a base 11 to which the flange 12 of a housing 13 is clamped, as by screws 14, against an annular seal 15. The base 11 consists of upper and lower plates 16 and 17 locked together by units 18 establishing sockets for the screws 14.

A support 19 of arcuate section is attached as at 20 to the base 11 and includes vertically spaced, transversely disposed shelves 21 and 22. The shelf 21 is supported by a tubular post 23 and is anchored thereto by a screw 24 which extends through the post 23 and into the base 11.

A generally indicated motor 25 has flanges 26 supported by spacers 27 and anchored by screws 28 which extend through the spacers 27 and into the shelf 21. Exteriorly of the housing 13, the base has a pair of threaded ports 29 and 30 both of which are in communication with the port 31 in the base within the housing 13, (see FIGURE 4) through a channel 32 in one of the proximate faces of the base establishing plates. An electric cable 33 extends through the port 29 and is anchored by the clamp 34 threaded on the port 29. The cable leads 33ª, 33ᵇ, and 33ᶜ extend upwardly through the port 31 around the support 19 and upwardly to the motor 25.

The drive shaft 35 of the motor 25 is provided with a gear 36 meshing with the larger gear 37 of the generally indicated idler 38 mounted on the spindle 39 attached to the shelf 21. The smaller gear 40 of the idler meshes with a gear 41 fast on a hollow shaft 42 journalled in and extending through the hub 43 with which the shelf 21 is provided. At its lower end, the shaft 42 has a radially disposed arm 44 having a radial passage 45 in communication with the passage defined by the hollow shaft 42. A conduit 46, for air under pressure, is attached to the port 29 by the threaded fitting 47 and a conduit 48 extends therefrom upwardly through the port 31 and is anchored to an edge of the support 19 as by clips 49.

The viscometer as thus far described is identical to that shown and described in said co-pending application but it will be noted that the hollow shaft 42 of this application is different in that it has a convex upper end face 42A. In practice, the shaft 42 is of stainless steel or has a stainless steel coat.

It will be noted, as may best be seen in FIGURE 6, that the upper end of the conduit 48 is locked by the sleeve 50 to the radial stem 51 carried by a cap 52 in communication with the downwardly opening port 53 axially of the concave face 54 seated on the convex upper end face 42A of the hollow shaft 42. The cap 52 is, in practice, made of a plastic, desirably one of the self-lubricating type. The cap 52 is held against rotation with its concave face 54 seated on the convex shaft end face 42A by a leaf spring 55 under sufficient pressure to prevent leakage between the complemental, mutually engaged faces.

The spring 55 is shown, see FIGURE 6, as having reversely bent portions 56 and 57 with the portion 57 clamped between the shelf 21 and a block 58 by screws 59 and is adjustably tensioned by the screw 60 extending transversely through the block 58 and into contact with the leaf spring portion 56.

A flywheel 61 has, as may best be seen in FIGURES 4–6, axial pivots 62 and 63 and diametrically arranged holes 64 through one of which freely extends a spacer 65 connecting the arm 44 to a radial arm 66 and defining a U-shaped connector. The arms 44 and 66 have seats for the flywheel pivots 62 and 63 which extend downwardly through the arm 66. The spacer 65 has a blade member 67 centrally entered between appropriate turns of a coiled spring 68 connected as a chord to the flywheel 61 thus to provide a yieldable, resilient connection therebetween and the hollow drive shaft 42.

A second U-shaped connector 69 has upper and lower parallel arms 70 and 71 supported by the flywheel pivots 62 and 63, respectively, for rotation independently thereof. The arm 70 includes a radially disposed extension 72 provided with a flat head 73 movable into and out of a position in which it functions as a flapper valve to close the port 74 of an outlet member 75 to which one end of a flexible conduit 76 is connected. The other end of the conduit 76 is connected to the rigid, curved tubing 77 secured in the radial passage 45. The outlet member 75 includes a bottom part 78 (see FIGURE 5) slidably guided in a slot 79 in the flywheel 61 and has a screw 80 threaded therethrough. The screw 80 is held in place by the arms 81 of a clip 82 (see FIGURE 4) attached to the upper face of the flywheel 61 as by screws 83. A set screw 84 is provided to lock the outlet member 75 in position.

Journalled in a hub 85 in the shelf 22 is a hollow shaft 86 within which there in an independently rotatable driven shaft 87. The shaft 87 has a hub 88 to which the inner end of a spiral spring 89 is anchored. The outer end of the spring 89 is attached to the downturned lug 90 at the outer end of the lower arm 71 of the connector 69 which end is diametrically opposed to the flapper valve head 75. The spring 89 is the driving connection between the flywheel 61 and the driven shaft 87 and, if a predetermined torque is exceeded, the spring 89 becomes partly wound and swings the flapper valve 73 into an open position. In order to adjust the effect of the coil spring 89, as may be seen in FIGURE 5, the lower arm 71 of the connector 69 has an extension 91 to which one end of a tensionsing spring 92 is anchored. The other end of the spring 92 is anchored to the short arm of a bell crank lever 93 pivoted as at 94 to the flywheel 61 and frictionally engaging therewith to maintain itself in any adjusted position.

The hollow shaft 86 is provided, at its upper end, see FIGURE 6, with a radial arm 95 to whose outer end there is connected the dowturned end of the arm 96 extending radially outwardly from the arm 66 to which it is attached. At its lower end, the hollow shaft 86 has an arm 97 clamped thereto and which has, at its outer end, a downwardly disposed spacer 98 provided with an arm 99 extending radially inwardly with a resilient support 100 at its free end for the upwardly disposed bearing 101 for the pivot 102 at the lower end of the shaft 86. The pivot 63 extends into an axial socket 87A in the upper end of the shaft 87.

The shaft 87 has a radial arm 103 having a spacer 104 at its outer end supporting a lower arm 105 extending radially inwardly below the arm 99 but is itself disposed to be engaged by the arm 99 on rotation of one shaft relative to the other to a predetermined extent. The arm 105 has a recess, see FIGURE 6, in its lower face to receive the ring 106 of a generally indicated universal joint 107 by which the shaft 108 is supported. The ring 106 is resiliently retained in place by the leaf spring 109.

The shaft 108 extends freely through a sleeve 110 threaded into the plate 17 of the base 11 and is locked thereto by a lock nut 111. A collar 112 is clamped to the exposed end of the shaft 108 which includes an eye 113 for a spindle 114 of the desired length is connected through the eye 113 and has a member (not shown) for entry into the liquid and, as it rotates, it is subject to the "drag" of the liquid.

From the foregoing, it will be apparent that as the member on the spindle 114 responds to the drag of the liquid the viscosity of which is being measured, the coil spring 89 will become partly wound thereby to cause the valve member 73 to move out of its port closing position. As the viscosity is to be measured in terms of pneumatic signals responsive to the flow of air through the conduit 48, the extent to which the valve member 73 moves in relation to the port 74 will not be a reliable factor if there is leakage.

In practice, such leakage would be in the junction between the cap 52 and the shaft 42 were it not for their concave-convex mating surfaces, the materials from which they are made, and the spring means holding them in mutual engagement without any objectionable friction problems resulting. As a consequence, problems of a rotatable air connection in a viscometer are eliminated.

I claim:

1. In a viscometer of the type in which the viscosity of a fluid is measured in terms of a pneumatic signal, a flywheel, a drive for said flywheel including a hollow shaft coaxial therewith and having an exposed end, a coaxial driven shaft, a coil spring coaxial with respect to said shafts with one end connected to said driven shaft, a valve including a member having a port and attached to said flywheel and a part closing member including an arm pivoted coaxially with respect to said flywheel and said shafts and connected to the other end of said spring to open said valve when said spring is wound by the turning of said shafts relative to each other as said driven shaft is subjected to the drag of said fluid, and means to supply air under pressure to said shaft including a cap seated on said hollow shaft end and provided with a conduit in communication with its interior, and a fixed spring resiliently seating said cap on said shaft end, said hollow shaft end and the face of said cap seated thereon being mating concave-convex surfaces.

2. The viscometer of claim 1 in which the mating surface of the shaft end is convex and the mating surface of the cap is concave.

3. The viscometer of claim 1 in which at least the mating surface of the shaft end has a surface finish and hardness characteristic of stainless steel and the cap is a plastic of the self-lubricating type.

No references cited.

DAVID SCHONBERG, *Primary Examiner.*